(12) United States Patent
Lu et al.

(10) Patent No.: US 9,966,076 B2
(45) Date of Patent: May 8, 2018

(54) VOICE CONTROL SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xin Lu, Shenzhen (CN); Yu-Yong Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days. days.

(21) Appl. No.: 15/297,142

(22) Filed: Oct. 19, 2016

(65) Prior Publication Data

US 2017/0154629 A1 Jun. 1, 2017

(30) Foreign Application Priority Data

Nov. 27, 2015 (CN) .......................... 2015 1 0848591

(51) Int. Cl.
  *G10L 21/00* (2013.01)
  *G10L 15/30* (2013.01)
  *G10L 15/22* (2006.01)

(52) U.S. Cl.
  CPC .............. *G10L 15/30* (2013.01); *G10L 15/22* (2013.01); *G10L 2015/223* (2013.01); *G10L 2015/227* (2013.01)

(58) Field of Classification Search
  CPC ...................................................... G10L 15/22

USPC ......................................................... 704/275
See application file for complete search history.

(56) References Cited

U.S. PATENT DOCUMENTS

| | | | | |
|---|---|---|---|---|
| 8,340,975 | B1* | 12/2012 | Rosenberger | G10L 15/22 704/270 |
| 9,043,210 | B1* | 5/2015 | Adcock | G10L 15/183 379/88.01 |
| 9,357,251 | B2* | 5/2016 | Dove | G06F 3/015 |
| 2003/0185358 | A1* | 10/2003 | Sakamoto | G10L 15/26 379/102.01 |
| 2004/0128137 | A1* | 7/2004 | Bush | G10L 15/26 704/275 |
| 2013/0325484 | A1* | 12/2013 | Chakladar | G06F 3/167 704/275 |
| 2014/0188485 | A1* | 7/2014 | Kim | G10L 21/00 704/275 |
| 2015/0154976 | A1* | 6/2015 | Mutagi | H04L 12/281 704/275 |
| 2016/0155443 | A1* | 6/2016 | Khan | G06F 1/3203 704/275 |

* cited by examiner

*Primary Examiner* — Jakieda Jackson
(74) *Attorney, Agent, or Firm* — ScienBiziP, P.C.

(57) ABSTRACT

A voice controlling method including determining a generating location of the voice signal when the voice signal is detected by one of a plurality of voice collecting devices. First voice collecting devices are determined from the plurality of voice collecting devices according to the generating location of the voice signal. Each of the first voice collecting devices is controlled to collect voice signals to obtain a plurality of collected voice signals. Once one or more preset voice commands are obtained by identifying the plurality of collected voice signals, a plurality of target devices are controlled to perform corresponding operations according to the one or more preset voice commands.

3 Claims, 4 Drawing Sheets

VOICE CONTROL SYSTEM AND METHOD

TECHNICAL FIELD

The present disclosure generally relates to voice control technology field, and particularly relates to a voice control system and a voice control method.

BACKGROUND

Electronic devices such as refrigerators and air conditioners can be manually controlled using portable devices. However, this kind of controlling method is not convenient for a user if the user does not carry the portable devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

Figure 1:
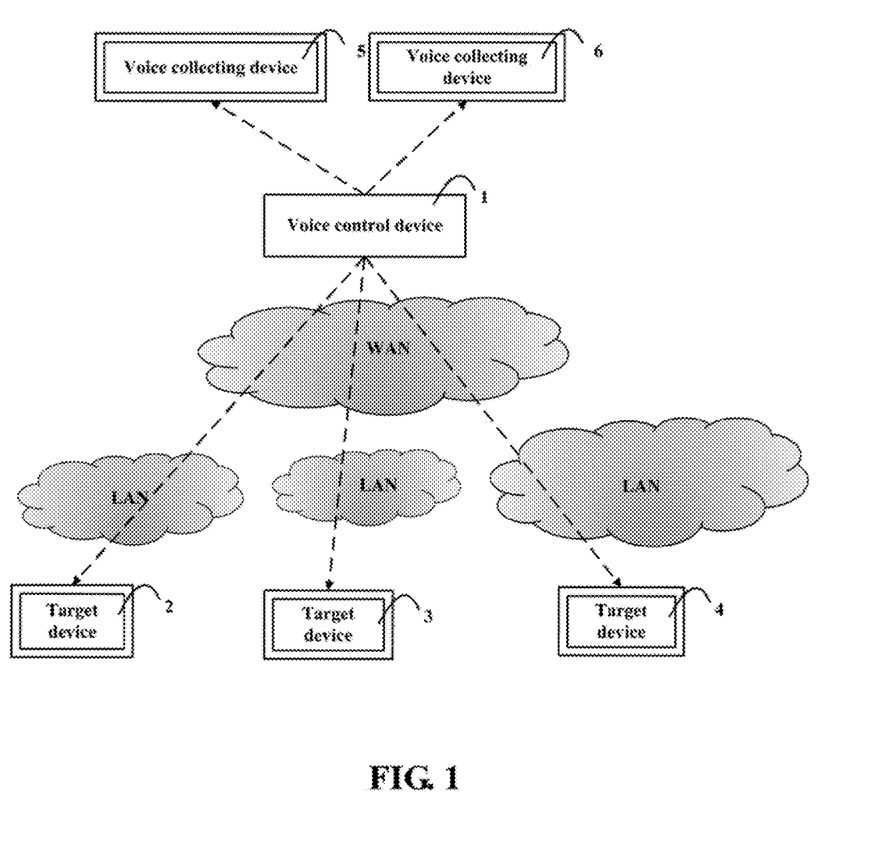
FIG. 1 is a schematic view illustrating an exemplary embodiment of a voice control device that is in communication with a plurality of voice collecting devices and a plurality of target devices.

FIG. 1 illustrates an exemplary embodiment of a voice control device being in communication with a plurality of voice collecting devices and a plurality of target devices. Depending on the embodiment, a voice control device 1 communicates with a plurality of voice collecting devices and a plurality of target devices via an Internet, a wide area network (WAN), a local area network (LAN), or a wired network. In at least one embodiment, the plurality of voice collecting devices can include, but are not limited to, a voice collecting device 5 and a voice collecting device 6. The plurality of target devices can include, but are not limited to, a target device 2, a target device 3, and a target device 4. It should be noted that a number of the plurality of voice collecting devices and a number of the plurality of target devices should not be limited as illustrated in FIG. 1.

In at least one embodiment, the voice control device 1 monitors and manages the plurality of voice collecting devices. The voice control device 1 processes and analyzes voice commands included in voice signals that are collected by each of the plurality of voice collecting devices. The voice control device 1 further controls the plurality of target devices according to the voice commands. In at least one embodiment, the plurality of voice collecting devices can be microphones, or other devices used for collecting voice information. Each of the plurality of voice collecting devices collects voice signals around the each of the plurality of voice collecting devices, and transmits the voice signals to the voice control device 1.

In at least one embodiment, the voice control device 1 identifies the voice signals and determines a generating location of each of the voice signals. The voice control device 1 extracts a voice command from each of the voice signals, and transmits each voice command to a corresponding target device. In at least one embodiment, the voice control device 1 further records each generating location of each of the voice signals in order to check and monitor each of the plurality of target devices according to the each generating location. In at least one embodiment, the generating location can be defined to be a location where the voice signal generated.

In at least one embodiment, the voice control device 1 can be a mobile phone, a personal digital assistant, or any other suitable device. In at least one embodiment, the plurality of target devices can be electronic devices such as video players, monitors, computers, mobile phones, automatic machines, factory monitoring devices, or home appliances such as televisions, air conditioners, refrigerators, or lighting devices. Each of the plurality of target devices receives the voice command and then operates accordingly.

Figure 2:
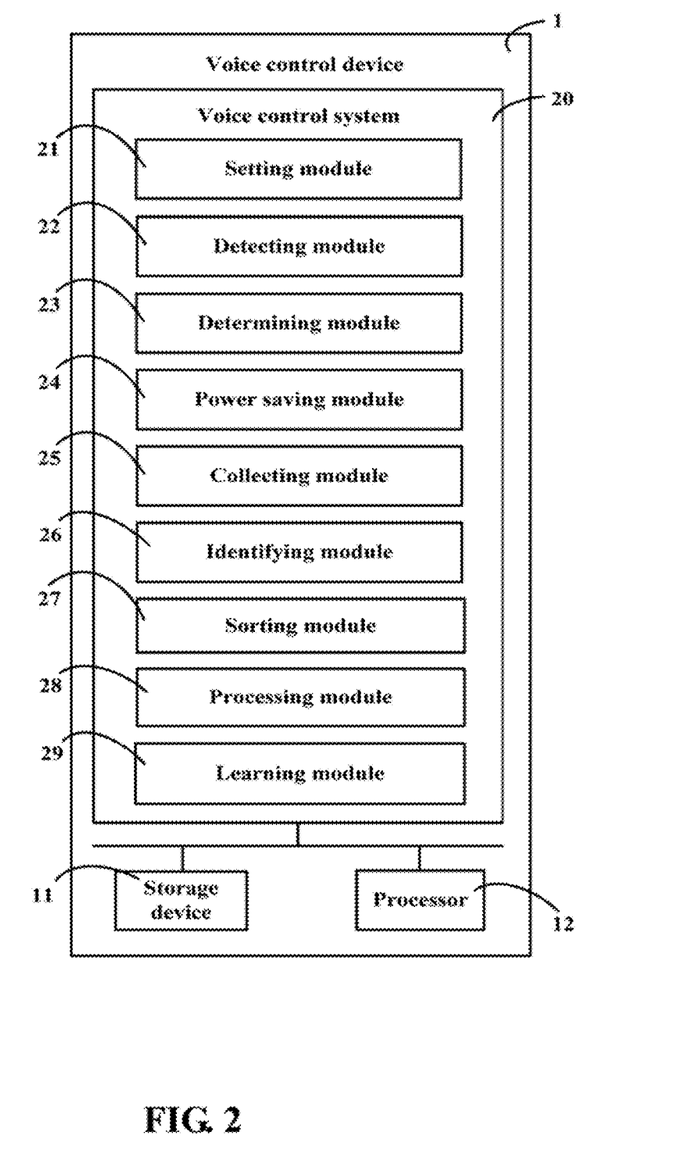
FIG. 2 is a schematic view illustrating an exemplary embodiment of a voice control device including a voice control system.

In at least one embodiment, the voice control device 1 can include, but is not limited to, a storage device 11, at least one processor 12, and the voice control system 20 (shown in FIG. 2). In at least one embodiment, the storage device 11 can be an internal storage of the voice control device 1. For example, the storage device 11 can be a hard drive or a memory of the voice control device 1. In at least one embodiment, the storage device 11 can also be an external storage of the voice control device 1. For example, the storage device 11 can be a portable external hard drive, a smart media card (SMC), a secure digital card (SD card), or a flash card.

In other embodiments, the storage device 11 can include the internal storage and the external storage of the voice control device 1. The storage device 11 can be used to store software applications installed in the voice control device 1 and data corresponding to the software applications. For example, the storage device 11 stores an operating system of the voice control device 1. The at least one processor 12 can be a central processing unit (CPU), microprocessor, or data processing chip. The at least one processor 12 can be used to execute the software applications and calculate the data. For example, the at least one processor 12 can execute the voice control system 20 of the voice control device 1.

In at least one embodiment, the voice control system 20 can include computerized instructions in the form of one or more programs that can be stored in the storage device 11 and executed by the at least one processor 12. In at least one embodiment, the voice control system 20 can be integrated in the at least one processor 12. In other embodiments, the voice control system 20 can be independent from the at least one processor 12. Referring to FIG. 2, the voice control system 20 can include one or more modules, for example, a setting module 21, a detecting module 22, a determining module 23, a power saving module 24, a collecting module 25, an identifying module 26, a sorting module 27, a processing module 28, and a learning module 29.

The setting module 21 can preset one or more voice commands in response to user input. The setting module 21 can further preset an operation rule of the one or more voice commands. In at least one embodiment, the setting module 21 can preset the one or more voice commands in response to voice signals inputted through a microphone of the voice control device 1 or through one of the plurality of the voice collecting devices by a user. In at least one embodiment, the voice control device 1 is equipped with a voice database and a voice identifying algorithm. In at least one embodiment, the voice database and the voice identifying algorithm can be stored in the storage device 11. In at least one embodiment, the setting module 21 can preset the one or more voice commands and the operation rule through the following steps.

Firstly, the setting module 21 can receive voice signals input by the user. The setting module 21 can further invoke the voice identifying algorithm to analyze the voice signals to generate one or more first commands. For example, the setting module 21 can generate first commands such as "turn on" and "turn off" respectively corresponding to voice signals such as "turn on a device" and "turn off a device".

Secondly, when the one or more first commands are generated, the setting module 21 can prompt the user to select one of the plurality of target devices to process the one or more commands. In at least one embodiment, the setting module 21 can prompt the user by controlling a speaker of the voice control device 1 to play a predetermined voice message. The setting module 21 can generate voice commands corresponding to specify operations of the selected one of the plurality of target devices by bounding the one or more first commands together with the selected one of the plurality of target devices. For example, the setting module 21 can generate a voice command "turn off a computer "A"" by bounding the first command "turn off" together with the computer "A".

Lastly, the setting module 21 can set the operation rule of the one or more voice commands. In at least one embodiment, the operation rule can be an order of the one or more voice commands or a priority level of each of the one or more voice commands. For example, the setting module 21 can set the priority level of "turn on the computer "A"" be higher than the priority level of "activate a music player of the computer "A"".

In other embodiments, the setting module 21 can further set the priority levels of voice commands of different users. For example, a voice command of a parent could be given a highest priority level, a voice command of a grandparent could be given a next priority level, and a voice command of a child could be given a lowest priority level. For another example, a voice command of a director of a factory could be given the highest priority level, a voice command of a equipment supervisor of the factory could be given the next priority level, and a voice command of a worker of the factory could be given the lowest priority level. In at least one embodiment, when one of the plurality of target devices receives different voice commands at the same time, the one of the plurality of target devices processes one of the different voice commands having the highest priority level. In other embodiments, the setting module 21 can set the operation rule based on its own requirements.

It should be noted that the setting module 21 can set one or more voice commands for each of other of the plurality of target devices and set a corresponding operation rule for each of the other of the plurality of target devices, according to the above steps.

The detecting module 22 can control the plurality of voice collecting devices that are connected with the voice control device 1 to detect voice signals. In at least one embodiment, the plurality of voice collecting devices can be microphones, or other devices that can be used for collecting voice signals. In at least one embodiment, the plurality of voice collecting devices can be installed at different locations within a specify area. The plurality of voice collecting devices can be used for collecting voice signals from the different locations. For example, the plurality of voice collecting devices can be installed in different rooms of a house, to detect voice signals generated in the different rooms.

When a voice signal is generated within the specify area, the determining module 23 can determine a generating location of the voice signal. The determining module 23 can further determine first voice collecting devices from the plurality of voice collecting devices according to the generating location of the voice signal. In at least one embodiment, the first voice collecting devices are located within a predetermined range from the generating location of the voice signal. In at least one embodiment, the predetermined range can be five meters, or other necessary distance. In at least one embodiment, the determining module 23 can determine second voice collecting devices from the plurality of voice collecting devices according to the generating location of the voice signal. In at least one embodiment, the second voice collecting devices are not located within the predetermined range.

The power saving module 24 can turn off the second voice collecting devices. By this action, purpose of power saving is achieved.

The collecting module 25 can control each of the first voice collecting devices to collect voice signals. The collecting module 25 can further transmit the voice signals collected by each of the first voice collecting devices to the identifying module 26. Thus the identifying module 26 can obtain a plurality of collected voice signals.

The identifying module 26 can determine whether there is no preset voice command included in the plurality of collected voice signals. In at least one embodiment, the identifying module 26 can invoke the voice identifying algorithm to identify the plurality of collected voice signals.

When the plurality of collected voice signals include one or more preset voice commands, the identifying module 26 can extract the one or more preset voice commands. Thus the identifying module 26 can obtain the one or more preset voice commands. In at least one embodiment, when repeated voice commands are existed in the one or more preset voice commands, the identifying module 26 can delete the repeated voice commands or merge the repeated voice commands to be one voice command. In at least one embodiment, the identifying module 26 can further identify a speaker corresponding to each of the one or more preset voice commands. The identifying module 26 can further determine a priority of the speaker corresponding to each of the one or more preset voice commands.

The sorting module 27 can sort the one or more preset voice commands to obtain sorted voice commands based on the preset operation rule. In at least one embodiment, the sorting module 27 can sort the one or more preset voice commands from high to low according to the priority level of each of the one or more preset voice commands. In other embodiments, the sorting module 27 can sort the one or more preset voice commands from high to low according to the priority level of the speaker corresponding to each of the one or more preset voice commands and/or the priority level of each of the one or more preset voice commands.

The processing module 28 can control the plurality of target devices to perform corresponding operations according to the sorted voice commands. For example, the processing module 28 can control the computer "A" to perform a turn off operation.

The learning module 29 can gather a number of times of the user operates each of the plurality of target devices in a normal mode. The learning module 29 can further gather corresponding operating time point when the user operates the each of the plurality of target devices in the normal mode. In at least one embodiment, when the number of times of the user operates one of the plurality of target devices in the normal mode at one operating time point is greater than a preset value, or when the number of times of the user operates the one of the plurality of target devices in the normal mode during a time period is greater than the preset value, the learning module 29 can automatically generate a voice command corresponding to the operation of the one of the plurality of target devices. In at least one embodiment, the learning module 29 can automatically processes the generated voice command at the one operating time point or during the time period. In at least one embodiment, the normal mode can be defined to be a mode that the one of the plurality of target devices not voice controlled by the user.

In at least one embodiment, the preset value can be five, or other necessary value based on different requirements. For example, when the user turns off a television at each 10:00 pm in five consecutive days, the learning module 29 can automatically generate a first voice command corresponding to the operation of turning off the television at 10:00 pm. The first voice command may be "turn off the television at each 10:00 pm". The learning module 29 can further automatically process the first voice command by automatically turning off the television at each 10:00 pm. For another example, when the user turns on the television between each 7:30 pm to 8:00 pm in five consecutive days, the learning module 29 can automatically generate a second voice command corresponding to the operation of turning on the television between 7:30 pm to 8:00 pm. The learning module 29 can automatically process the second voice command by automatically turning on the television between each 7:30 pm to 8:00 pm.

Figure 3:
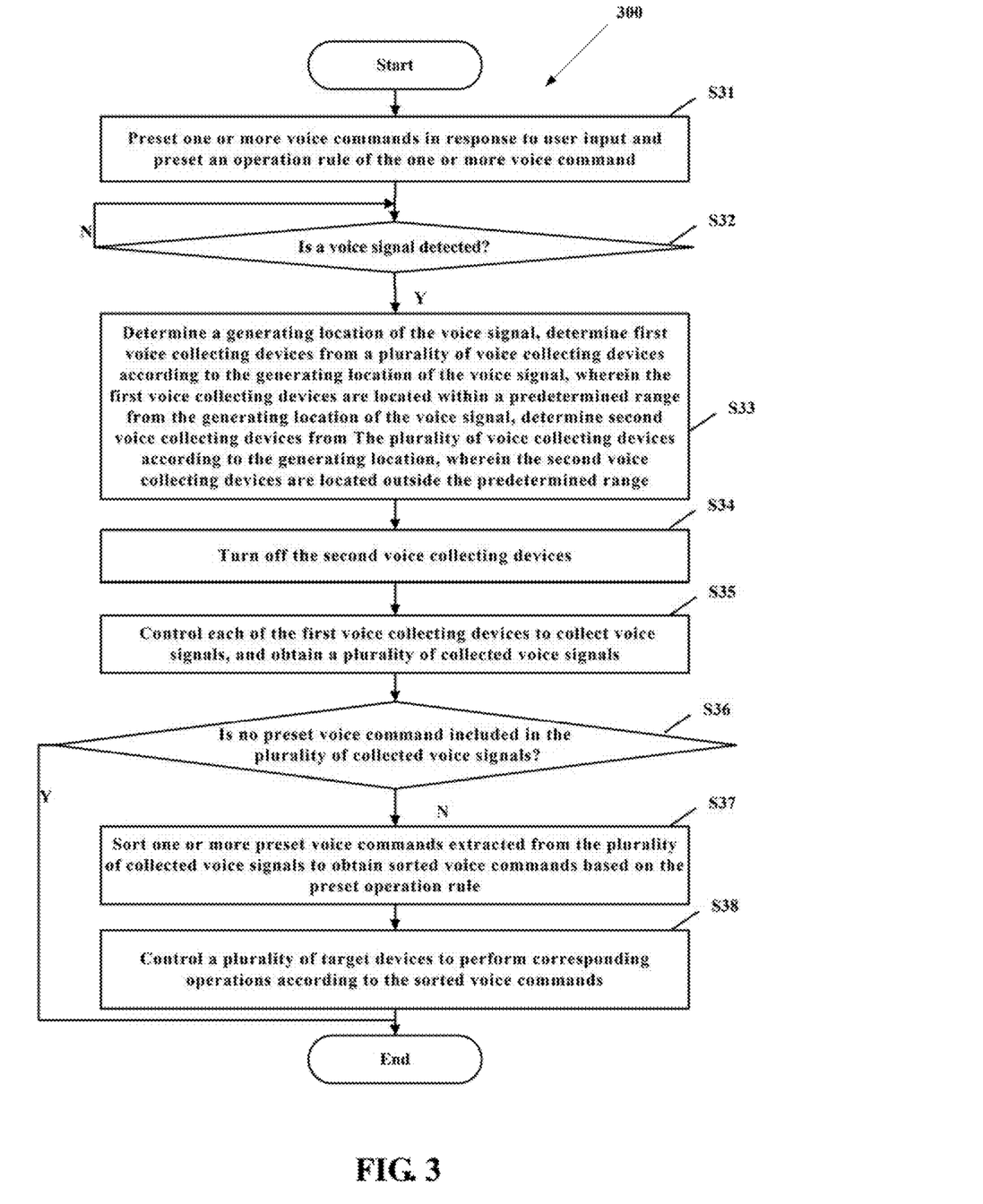
FIG. 3 illustrates an exemplary method of controlling the plurality of target devices.

FIG. 3 illustrates a flowchart which is presented in accordance with an example embodiment. The example method 300 is provided by way of example, as there are a variety of ways to carry out the method. The method 300 described below can be carried out using the configurations illustrated in FIGS. 1-2, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 31. Depending on the embodiment, additional steps can be added, others removed, and the ordering of the steps can be changed.

At block 31, the setting module 21 can preset one or more voice commands in response to user input. The setting module 21 can further presets an operation rule of the one or more voice commands. In at least one embodiment, the setting module 21 can preset the one or more voice commands in response to voice signals inputted through a microphone of the voice control device 1 or through one of the plurality of the voice collecting devices by a user. In at least one embodiment, the voice control device 1 is equipped with a voice database and a voice identifying algorithm. In at least one embodiment, the voice database and the voice identifying algorithm can be stored in the storage device 11. In at least one embodiment, the setting module 21 can preset the one or more voice commands and the operation rule through the following steps.

Firstly, the setting module 21 can receive voice signals inputted by the user. The setting module 21 can further invoke the voice identifying algorithm to analyze the voice signals to generate one or more first commands. For example, the setting module 21 can generate first commands such as "turn on" and "turn off" respectively corresponding to voice signals such as "turn on a device" and "turn off a device".

Secondly, when the one or more first commands are generated, the setting module 21 can prompt the user to select one of the plurality of target devices to process the one or more commands. In at least one embodiment, the setting module 21 can prompt the user by controlling a speaker of the voice control device 1 to play a predetermined voice message. The setting module 21 can generate voice commands corresponding to specify operations of the selected one of the plurality of target devices by bounding the one or more first commands together with the selected one of the plurality of target devices. For example, the setting module 21 can generate a voice command "turn off a computer "A"" by bounding the first command "turn off" together with the computer "A".

Lastly, the setting module 21 can set the operation rule of the one or more voice commands. In at least one embodiment, the operation rule can be an order of the one or more voice commands or a priority level of each of the one or more voice commands. For example, the setting module 21 can set the priority level of "turn on the computer "A"" be higher than the priority level of "activate a music player of the computer "A"".

In other embodiments, the setting module 21 can further set the priority levels of voice commands of different users. For example, a voice command of a parent could be given a highest priority level, a voice command of a grandparent could be given a next priority level, and a voice command of a child could be given a lowest priority level. For another example, a voice command of a director of a factory could be given the highest priority level, a voice command of a equipment supervisor of the factory could be given the next priority level, and a voice command of a worker of the factory could be given the lowest priority level. In at least one embodiment, when one of the plurality of target devices receives different voice commands at the same time, the one of the plurality of target devices processes one of the different voice commands having the highest priority level. In other embodiments, the setting module 21 can set the operation rule based on its own requirements.

It should be noted that the setting module 21 can set one or more voice commands for each of other of the plurality of target devices and set a corresponding operation rule for each of the other of the plurality of target devices, according to the above steps.

At block 32, the detecting module 22 can control the plurality of voice collecting devices that are connected with the voice control device 1 to detect whether a voice signal is generated. When one of the plurality of voice collecting devices detects the voice signal, the process goes to block 33. When none of the plurality of voice collecting devices detects the voice signal, the process of block 32 continues. In at least one embodiment, the plurality of voice collecting devices can be microphones, or other devices that can be used for collecting voice signals. In at least one embodiment, the plurality of voice collecting devices can be installed at different locations within a specify area. The plurality of voice collecting devices can be used for collecting voice signals from the different locations. For example, the plurality of voice collecting devices can be installed in different rooms of a house, to detect voice signals generated in the different rooms.

At block 33, when a voice signal is generated within the specify area, the determining module 23 can determine a generating location of the voice signal. The determining module 23 can further determine first voice collecting devices from the plurality of voice collecting devices according to the generating location of the voice signal. In at least one embodiment, the first voice collecting devices are located within a predetermined range from the generating location of the voice signal. In at least one embodiment, the predetermined range can be five meters, or other necessary distance. In at least one embodiment, the determining module 23 can determine second voice collecting devices from the plurality of voice collecting devices according to the generating location of the voice signal. In at least one embodiment, the second voice collecting devices are not located within the predetermined range.

At block 34, the power saving module 24 can turn off the second voice collecting devices. By this action, purpose of power saving is achieved.

At block 35, the collecting module 25 can control each of the first voice collecting devices to collect voice signals. The collecting module 25 can further transmit the voice signals collected by each of the first voice collecting devices to the identifying module 26. Thus the identifying module 26 can obtain a plurality of collected voice signals.

At block 36, the identifying module 26 can determine whether there is no preset voice command included in the plurality of collected voice signals. In at least one embodiment, the identifying module 26 can invoke the voice identifying algorithm to identify the plurality of collected voice signals. When the plurality of collected voice signals include one or more preset voice commands, the identifying module 26 can extract the one or more preset voice commands. Thus the identifying module 26 can obtain the one or more preset voice commands. In at least one embodiment, when the one or more preset voice commands are obtained, the process goes to block 37. When no preset voice command is obtained, the process is end. In at least one embodiment, when repeated voice commands are existed in the one or more preset voice commands, the identifying module 26 can delete the repeated voice commands or merge the repeated voice commands to be one voice command. In at least one embodiment, the identifying module 26 can further identify a speaker corresponding to each of the plurality of collected voice signals. The identifying module 26 can further determine a priority of the speaker corresponding to each of the one or more preset voice commands.

At block 37, the sorting module 27 can sort the one or more preset voice commands to obtain sorted voice commands based on the preset operation rule. In at least one embodiment, the sorting module 27 can sort the one or more preset voice commands from high to low according to the priority level of each of the one or more preset voice commands. In other embodiments, the sorting module 27 can sort the one or more preset voice commands from high to low according to the priority level of the speaker corresponding to each of the one or more preset voice commands and/or the priority level of each of the one or more preset voice commands.

At block 38, the processing module 28 can control the plurality of target devices to perform corresponding operations according to the sorted voice commands. For example, the processing module 28 can control the computer "A" to perform a turn off operation.

Figure 4:
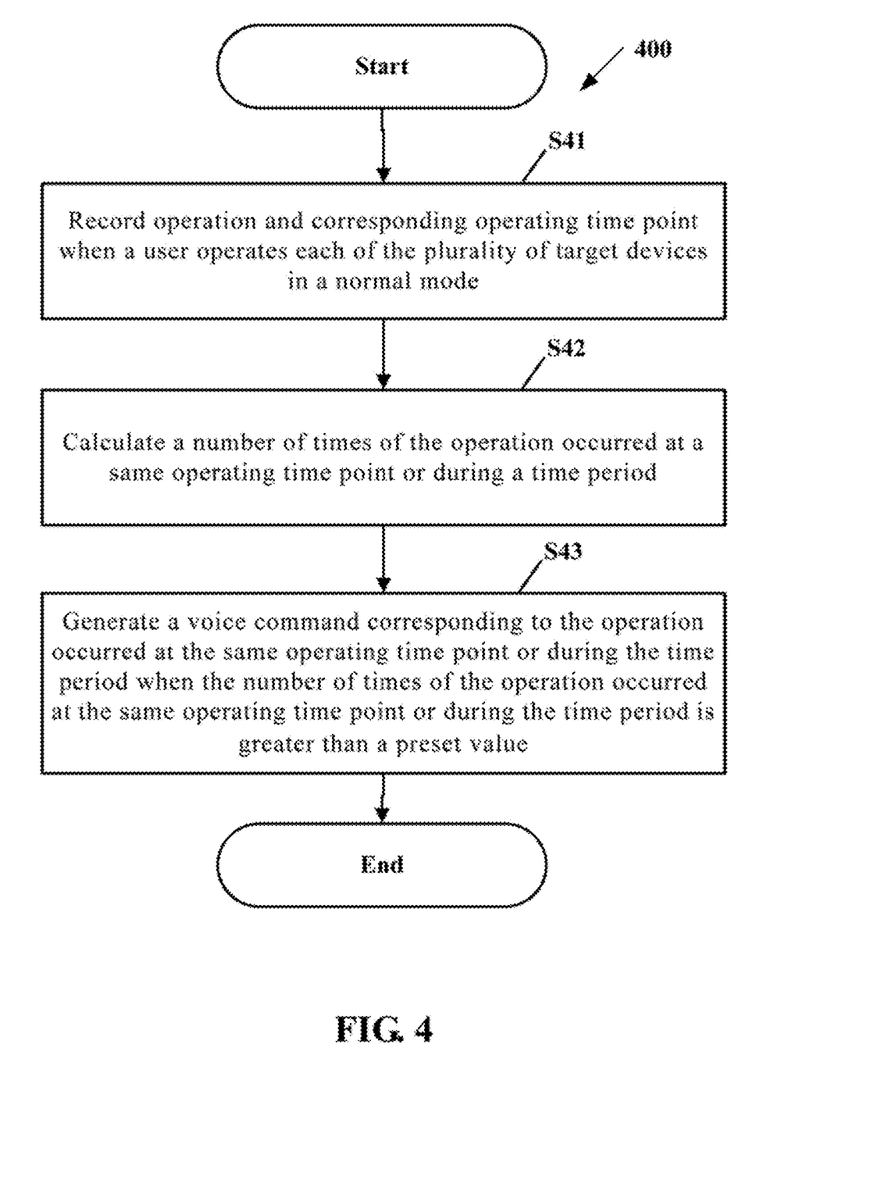
FIG. 4 illustrates an exemplary method of automatically generating a voice control command.

FIG. 4 illustrates a flowchart which is presented in accordance with an example embodiment. The example method 400 is provided by way of example, as there are a variety of ways to carry out the method. The method 400 described below can be carried out using the configurations illustrated in FIGS. 1-2, for example, and various elements of these figures are referenced in explaining example method 400. Each block shown in FIG. 4 represents one or more processes, methods, or subroutines, carried out in the example method 400. Additionally, the illustrated order of blocks is by example only and the order of the blocks can be changed according to the present disclosure. The example method 400 can begin at block 41. Depending on the embodiment, additional steps can be added, others removed, and the ordering of the steps can be changed.

At block 41, when the user operates each of the plurality of target devices in a normal mode, the learning module 29 can record the operation and corresponding operating time point. In at least one embodiment, the normal mode can be defined to be a mode that the target device is not voice controlled by the user.

At block 42, the learning module 29 can calculate a number of times of the operation occurred at a same operating time point or during a time period.

At block 43, when the number of times of the operation occurred at the same operating time point or during the time period is greater than a preset value, the learning module 29 can automatically generate a voice command corresponding to the operation occurred at the same operating time point or during the time period. In at least one embodiment, the learning module 29 can automatically processes the generated voice command at the operating time point or during the time period.

In at least one embodiment, the preset value can be five, or other necessary value based on different requirements. For example, when the user turns off a television at each 10:00 pm in five consecutive days, the learning module 29 can automatically generate a first voice command corresponding to the operation of turning off the television at 10:00 pm. The first voice command may be "turn off the television at each 10:00 pm". The learning module 29 can further automatically process the first voice command by automatically turning off the television at each 10:00 pm. For another example, when the user turns on the television between each 7:30 pm to 8:00 pm in five consecutive days, the learning module 29 can automatically generate a second voice command corresponding to the operation of turning on the television between 7:30 pm to 8:00 pm. The learning module 29 can automatically process the second voice command by automatically turning on the television between each 7:30 pm to 8:00 pm.

The embodiments shown and described above are only examples. Many details are often found in the art such as the other features of a source scheduling method, and a wireless communication device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the board general meaning of the terms used in the claims. It will therefore be appreciated that the embodiments described above may be modified within the scope of the claims.

What is claimed is:

1. A voice control method for controlling a plurality of target devices using a voice control device, the voice control device being connected with a plurality of voice collecting devices that are installed at different locations of an area, the method comprising:
   controlling each of the plurality of voice collecting devices to detect a voice signal generated in the area;
   determining a generating location of the voice signal when the voice signal is detected;
   determining first voice collecting devices from the plurality of voice collecting devices according to the generating location of the voice signal, wherein the first voice collecting devices are located within a predetermined range from the generating location of the voice signal;
   controlling each of the first voice collecting devices to collect voice signals and obtaining a plurality of collected voice signals;
   extracting one or more preset voice commands from the plurality of collected voice signals by identifying the plurality of collected voice signals, and obtaining the one or more preset voice commands; and
   controlling the plurality of target devices to perform corresponding operations according to the one or more preset voice commands, wherein when one of the plurality of target devices receives different voice commands at the same time, the one of the plurality of target devices is controlled to process one of the different voice commands having the highest priority level;
   wherein before controlling each of the plurality of voice collecting devices to detect the voice signal generated in the area, the method further comprises:
   (a). generating one or more first voice commands in response to user input;
   (b). prompting a user to select a certain target device from the plurality of target devices to process the one or more first voice commands;
   (c). generating one or more voice commands for the certain target device by bounding the one or more first voice commands together with the certain target device; and
   (d). executing (a)-(c) to generate one or more voice commands for other target devices of the plurality of target devices excepting the certain target device;
   setting an operation rule for the one or more voice commands corresponding to each target device, wherein the operation rule defines a priority level of each of the one or more voice commands corresponding to each target device.

2. A voice control device, being connected with a plurality of voice collecting devices that are installed at different locations of an area, comprising:
   at least one processor;
   a storage device that stores one or more programs, when executed by the at least one processor, cause the at least one processor to;
   control each of the plurality of voice collecting devices to detect a voice signal generated in the area;
   determine a generating location of the voice signal when the voice signal is detected;
   determine first voice collecting devices from the plurality of voice collecting devices according to the generating location of the voice signal, wherein the first voice collecting devices are located within a predetermined range from the generating location of the voice signal;
   control each of the first voice collecting devices to collect voice signals and obtain a plurality of collected voice signals;
   extract one or more preset voice commands from the plurality of collected voice signals by identifying the plurality of collected voice signals, and obtain the one or more preset voice commands; and
   control the plurality of target devices to perform corresponding operations according to the one or more preset voice commands, wherein when one of the plurality of target devices receives different voice commands at the same time, the one of the plurality of target devices is controlled to process one of the different voice commands having the highest priority level;
   wherein before controlling each of the plurality of voice collecting devices to detect the voice signal generated in the area, the at least one processor is further caused to:
   (a). generate one or more first voice commands in response to user input;
   (b). prompt a user to select a certain target device from the plurality of target devices to process the one or more first voice commands;
   (c). generate one or more voice commands for the certain target device by bounding the one or more first voice commands together with the certain target device; and
   (d). execute (a)-(c) to generate one or more voice commands for other target devices of the plurality of target devices excepting the certain target device;
   set an operation rule for the one or more voice commands corresponding to each target device, wherein the operation rule defines a priority level of each of the one or more voice commands corresponding to each target device.

3. A non-transitory storage medium having stored thereon instructions that, when executed by a processor of a voice control device, causes the processor to perform a voice control method for controlling a plurality of target devices, a plurality of voice collecting that are installed at different locations of an area being connected with the voice control device, wherein the method comprises:

controlling each of the plurality of voice collecting devices to detect a voice signal generated in the area;

determining a generating location of the voice signal when the voice signal is detected;

determining first voice collecting devices from the plurality of voice collecting devices according to the generating location of the voice signal, wherein the first voice collecting devices are located within a predetermined range from the generating location of the voice signal;

controlling each of the first voice collecting devices to collect voice signals and obtaining a plurality of collected voice signals;

extracting one or more preset voice commands from the plurality of collected voice signals by identifying the plurality of collected voice signals, and obtaining the one or more preset voice commands; and controlling the plurality of target devices to perform corresponding operations according to the one or more preset voice commands, wherein when one of the plurality of target devices receives different voice commands at the same time, the one of the plurality of target devices is controlled to process one of the different voice commands having the highest priority level;

wherein before controlling each of the plurality of voice collecting devices to detect the voice signal generated in the area, the method further comprises:

(a). generating one or more first voice commands in response to user input;

(b). prompting a user to select a certain target device from the plurality of target devices to process the one or more first voice commands;

(c). generating one or more voice commands for the certain target device by bounding the one or more first voice commands together with the certain target device; and (d). executing (a)-(c) to generate one or more voice commands for other target devices of the plurality of target devices excepting the certain target device;

setting an operation rule for the one or more voice commands corresponding to each target device, wherein the operation rule defines a priority level of each of the one or more voice commands corresponding to each target device.

* * * * *